Dec. 17, 1929.  L. E. WILLIAMS  1,739,746
LATCH FOR TILTABLE DUMP BODIES
Original Filed April 27, 1927
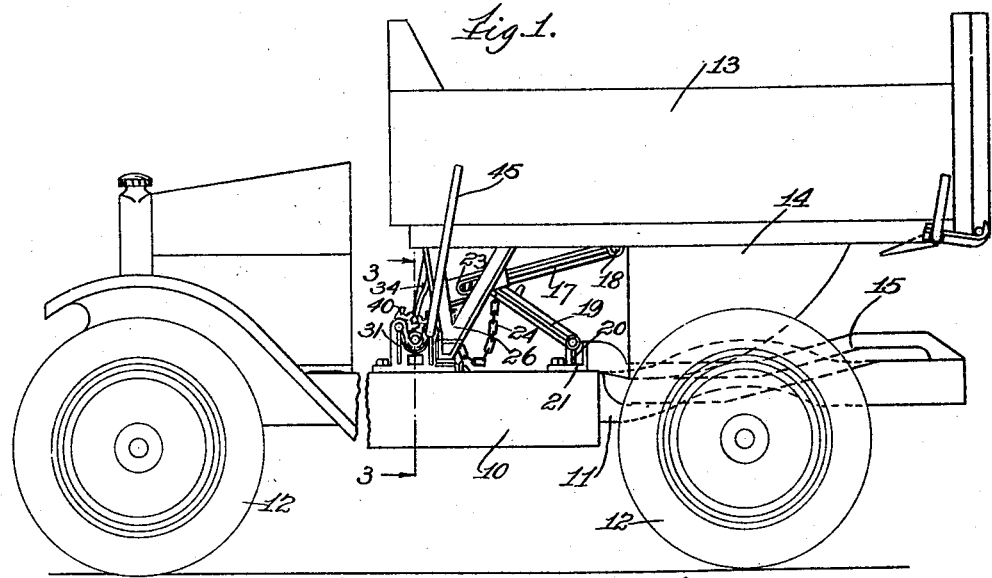

Patented Dec. 17, 1929

1,739,746

UNITED STATES PATENT OFFICE

LEROY E. WILLIAMS, OF EDGERTON, WISCONSIN, ASSIGNOR TO HIGHWAY TRAILER COMPANY, OF EDGERTON, WISCONSIN, A CORPORATION OF WISCONSIN

LATCH FOR TILTABLE DUMP-BODIES

Original application filed April 27, 1927, Serial No. 186,836. Divided and this application filed April 12, 1929. Serial No. 354,489.

This is a division of my co-pending application, Serial No. 186,836, filed April 27, 1927, relating to dump body vehicles of the type adapted to be tilted or rolled for discharging the load by gravity. The object of this invention is the provision of improved means for latching the body to the frame when the former is in upright position. It consists in the elements and features of construction, in combination, herein shown and described, and as indicated by the claims.

In the drawings:

Figure 1 is a view in side elevation of a vehicle equipped with latch means embodied in the present invention; the vehicle proper being shown somewhat diagrammatically, and broken to condense the view.

Figure 2 is a fragmentary view in side elevation, showing the body in dumping position.

Figure 3 is an enlarged transverse sectional view through the latch means taken as indicated at the line 3—3 on Figure 1, with the skirt board and foot step omitted.

Figure 4 is an enlarged view of the latch means, taken substantially as indicated at the line 4—4 on Figure 3.

Figure 5 is a sectional view taken substantially as indicated at the line 5—5 on Figure 3, showing the cams rotated to a position for releasing the locking pin.

The present invention is illustrated in the drawings in connection with a motor vehicle having a chassis, 10, including a pair of longitudinally extending side frame members, 11, suitably braced together and mounted on supporting wheels, 12. A dump body of conventional construction is indicated at 13, mounted on a pair of transversely spaced rockers, 14, which are adapted to roll on longitudinally disposed tracks, 15, carried in the side frame members, 11, adjacent the rear end thereof, whereby said body is adapted to be carried rearwardly and elevated to tilting position for discharging its load by gravity. The rockers are preferably positioned so that the point at which they normally support the body when the same is in horizontal position, is slightly forward of the center of gravity of the body, so that when the body is loaded fairly uniformly, there will be a tendency of the body to tilt rearwardly under the influence of gravity.

The body is limited in its tilting movement by a check link connected to the under side of the body, adjacent its middle, forwardly of the rockers. Said check link is composed of a link, 17, pivotally connected at its upper end to lugs, 18, on the under side of the body and its lower end having a yielding pivotal connection with the upper end of the link, 19, which has its opposite end pivotally connected to lugs, 20, secured on a transverse frame member, 21, mounted on the side frames, 11. The yielding connection at the joint of the links, 17 and 19, comprises a pair of coil springs, 22, housed in casings, 23, formed integrally on the lower end of the link, 17, and the link, 19, is formed to co-operate therewith and compress said springs as said links substantially approach straight-line position.

This yielding connection of the toggle links serves as a shock absorber for gradually retarding the motion of the body and counteracting the impact and jarring usually incident to dumping action of mechanisms of this character. A link chain, 24, is connected to the upper end of the toggle link, 19, and is adapted to be pulled by means hereinafter described, for starting said links buckling forwardly to permit the body to be returned to horizontal position.

The forward end of the body is provided with supplemental or auxiliary supports in the nature of cast pedestals, 26, spaced transversely and secured to the under side of the body. As will hereinafter appear, these pedestals co-operate with my improved latch means for securing the body in horizontal position on the frame. The lower ends of said pedestals are bifurcated fore-and-aft, forming grooves, 27, which are adapted to register with and be seated upon upstanding lugs, 28, of bracket members, 29, which are spot-welded in position on a transversely extending angle member, 30, which member is supported at its outer ends on and secured to the rear end of the latch or locking mechanism housings, 31, which are mounted on each of the frame members, 11, by means of bolts, 32, and U-bolts, 33. The tongue and groove feature of the pedestals and lugs, 28, prevent lateral movement of the body with respect to the frame, when the former is in horizontal position, and also eliminates possible weaving of the various members.

Integral with and extending forwardly from the pedestals are brackets, 34, in the lower end of which are firmly secured, transversely disposed locking pin members, 35, which project laterally outward for engagement with the latching mechanisms on opposite sides of the chassis, and adapted to be positively and firmly held in their seats, 36, formed in the housings, 31. It will be understood that a single rod may be employed in lieu of the pins, 35, carried by the pedestals.

These locking mechanisms each includes a pair of combination cam and gear members mounted in said housings; each member consisting of a gear segment, 40, of slightly more than a 90° section, formed integral with a laterally adjacent cam member, 41. Said cam is provided with an annular face of slightly more than a 90° section, connecting to the gear segment at a point a trifle lower than the middle thereof. The face of the cam is slightly less than the pitch diameter of the gear segment, so that when mounted in assembled relation, the cams will have proper clearance for rotation when the gear segments are in mesh. One of the combination members is loosely journalled on a stub shaft, 43, fixed in the forward end of the housing, 31, the gear segment thereof being meshed with the gear segment of the other member which is fixedly secured on an operating shaft, 44, which shaft extends across to the opposite mechanism and the corresponding combination member thereof is also rigidly secured thereon. Said shaft is provided journal support in the rear part of the housings, 31, and one end thereof extends laterally beyond the housing and is bent upwardly to form an operating handle, 45, positioned for convenient manipulation.

Each of the cams is formed with a lug, 46, extending downwardly from the lower corner of the cam face, and has an obliquely disposed coil spring, 47, connected thereto at one end, and the other end of said spring being connected to the base of the housing, so that when the members are rotated the tension in the springs is increased, and thus tend to restore said members to their original position when released, as shown in Figure 4.

Each pair of cams co-operate with a pin, 35, carried by the adjacent pedestal for holding the pin captive, thus maintaining the body in horizontal position. Thus by swinging the operating handle forwardly (to the left from the position shown in Figure 1) the combination members of each mechanism are rotated toward each other in a downwardly direction, and when the upper corners of the cam faces become sufficiently separated, as shown in Figure 5, to release the pins, 35, from their seats, 36, the body will normally tilt rearwardly to discharge its load under the influence of gravity. To return the body to horizontal position, a crank, 48, is secured to the operating shaft adjacent the middle of the vehicle, and is connected to the end of the chain, 24, so that by again swinging the operating handle forwardly, the slack in the chain is taken up, and a pull exerted on the toggle links, 17 and 19, to start them buckling forwardly; the weight of the body then automatically returning it to upright position. As the body approaches horizontal position, the pins, 35, impinge substantially centrally against the faces of the respective pairs of cams, forcing the combination members to rotate, and causing the cams to separate to permit the pins to pass downwardly therebetween, and lodge in their seats, 36, in said housings, 31.

During this time the pedestals become seated in supporting position on the upstanding lugs, 28; the cams then being snapped back to original position by their springs, 47, thus closing over the pins to hold them captive in their seats to maintain the body in horizontal position. It is to be understood that the design and arrangement of parts is such that the cams are permitted free rotation when the pins are in position in their seats, 36.

I claim:

1. In combination with a vehicle frame and a tiltable load-receiving body thereon, locking means for securing said body in horizontal position on the frame, said means comprising a horizontally extending locking pin carried on the body, a pair of intermeshing gears with laterally projecting cam faces having annular portions closely adjacent each other and non-circular portions registerable with each other when the gears are rotated to provide a space for the passage of the pin, and means for returning said gears to bring their annular cam portions into proximity for holding the locking pin captive.

2. In the combination defined in claim 1, said means for returning the gears being spring means adapted to rotate them through a part of a revolution, and means operable at will for turning said gears in opposition to the spring means to release the locking pin.

3. In the combination defined in claim 1, a bearing frame supporting said gears, said frame having an upwardly open recess between the axes of said gears extending below their common center line to provide clearance for the pin when it is held captive below the annular portions of the cam faces.

4. In the combination defined in claim 1, said cam faces having impact portions adjacent their annular portions, said impact portions being arranged to extend in approximately horizontal direction at a plane above the common center line of the gears to receive the impact of the locking pin whereby the latter will rotate the gears and pass between said impact portions, the means for returning said gears into locking position being designed for automatically causing said locking movement.

5. In combination with a vehicle frame and a tiltable load-receiving body thereon, a supplemental support for the body on the frame, locking means adjacent said support for maintaining said body in upright position on the frame, said means including a horizontally disposed locking pin carried by the support, a pair of intermeshing gears with laterally projecting cam faces having annular portions closely adjacent each other and non-circular portions registerable with each other when the gears are rotated to provide a space for the passage of the pin, and means for returning said gears to bring their annular camp portions into proximity for holding the locking pin captive.

LEROY E. WILLIAMS.